United States Patent [19]

von der Heide

[11] Patent Number: 5,033,684
[45] Date of Patent: Jul. 23, 1991

[54] SILAGE CUTTING MACHINE WITH U-SHAPED HOLDING FRAME

[76] Inventor: Hans von der Heide, Ibbenbürener Strasse 17, D-4533 Laggenbeck, Fed. Rep. of Germany

[21] Appl. No.: 334,018

[22] Filed: Apr. 5, 1989

[30] Foreign Application Priority Data

Apr. 9, 1988 [DE] Fed. Rep. of Germany ....... 3811924

[51] Int. Cl.[5] ............................................... B02C 1/00
[52] U.S. Cl. .................................... 241/101.7; 56/296; 56/297; 241/283; 83/697; 83/928
[58] Field of Search ................. 241/101.7, 283, 262, 241/263; 82/784, 928, 697; 56/264, 268, 296, 297, 299

[56] References Cited

FOREIGN PATENT DOCUMENTS 3613647 11/1987 Fed. Rep. of Germany ... 241/101.7
3624828 1/1988 Fed. Rep. of Germany ... 241/101.7
602640 4/1978 U.S.S.R. .............................. 241/283

Primary Examiner—Joseph M. Gorski
Attorney, Agent, or Firm—Felfe & Lynch

[57] ABSTRACT

Silage cutter has a U-shaped frame which is movable vertically on a mounting rack. The frame has a pair of lateral members and a front member connected thereto by a pair of corner coupling elements. Each member has a front and a rear cutting blade slidably mounted thereon and driven in opposite directions by an arrangement of a drive cylinder and a lever on each lateral member. The blades on the lateral members drive the blades or the front member through force transmitting means such as upper and lower sets of steel rollers in each corner coupling element.

9 Claims, 5 Drawing Sheets

SILAGE CUTTING MACHINE WITH U-SHAPED HOLDING FRAME

BACKGROUND OF THE INVENTION

The invention relates to a silage cutting machine with a U-shaped holding frame which can be mounted on a rack and moved up and down on the latter cutting tools configured as knife-like, rigid cutting blades which can be reciprocated by drive means are mounted on both sides of the rigid holding frame.

Silage cutters serve for cutting blocks of silage, especially from flat silos. Silage cutting machines are usually used as attachments for farm tractors or other similar vehicles, and in that case must assure, on the one hand, that the highest possible cutting power will be applied by the drive means to the cutting blades. On the other hand, on account of the given limits on the total weight of the tractor, the silage cutting machine must be as light as possible in order to permit the highest possible payload of silage.

Conventionally, silage cutting machines are constructed such that, for the production of a precise cut in the silage, the cutting tools on the lateral limbs of the holding frame members as well as on the front cutting mechanism are configured in two ways. Either simple cutting blades which by means of working cylinders held laterally at the front end of the lateral limbs of the holding frame cut out the silage block by a saw-like drawing back and forth of the cutting blades, or the cutting blades of the front cutting mechanism are joined to the lateral cutting mechanisms by flexible corner connecting means.

Also it is known to construct the cutting tools as double-edged tools, one cutting blade being fixedly mounted and the other being drawn back and forth. Also, the driving force is produced in part by a single actuator mounted on the front limb of the holding frame, the vertical movement of the working cylinder being converted by a connecting means as well as lever arms to horizontal knife blade movements. In this case the pulling force is transmitted, through bell cranks and other levers, from the front cutting blades to the side cutting blades.

This configuration calls for a complex design that is liable to give trouble and increases weight. It is disadvantageous that the driving means and the hydraulic lines have to be mounted in the working area of the cutting mechanism.

SUMMARY OF THE INVENTION

It is the object of the invention to permit a weight-saving, low-maintenance and very effective direct transmission of the thrust of the drive means to the cutting blades and to be able to eliminate the conversion of vertically acting thrust to horizontally acting pull which results from complicated linkage. This object is accomplished by mounting two working cylinders on the mounting frame of a forked configuration so that the driving force is transmitted as thrust (compressive force) through two levers movable back and forth in the cutting direction about fixedly installed joint pins to lever arms, journaled in each case vertically one over the other, of the side cutting tools held on a fixed central piece.

The superimposition of the end arms of the cutting tools is made possible by the fact that the inner cutting blades are overall higher than the outer cutting blades. This makes it possible to make the end arms, bent toward the center, run one over the other.

Inasmuch as the upper end arm of the side cutting blades is in each case joined to the upper arm of the drive lever, and the lower arm, which in each case moves contrariwise to the upper arm of the drive lever, is connected to the lower end arm of the side cutting blades, a contrary cutting blade movement is made possible.

The end arms of the side cutting blades pointing toward the front limb of the holding frame are in turn made to overlap one another and through two corner connecting elements they transmit the thrust to the associated end arms of the front cutting mechanism.

The configuration of the corner connecting elements is designed such that metal cylindrical rollers, disposed upright one over the other in two planes in a guide leading arcuately around the corner, and milled out arcuately on one side for better engagement with one another, transmit the thrust, via the end arm of the front and rear side cutting blades reaching into the upper and lower planes of the corner connecting element, to the associated end arm of the front cutting blades.

For the transmission of force in the guide a chain-like or steel band-like configuration can also be provided as force transmitting means.

It is also conceivable to construct the guides of the corner connecting elements as hydraulic jacks, in which case the end arms of the cutting blades would be made piston-like and hydraulic fluid could be used as the medium.

The advantages achievable with the invention are to be found especially in the fact that the driving force of the horizontally operating working cylinders can be transmitted directly as thrust to the cutting blades without the loss involved in levers.

The replacement of the complex lever designs and especially the use of the corner connecting elements in accordance with the invention for transmitting the working force, instead of flexible or bell-crank like corner connections, make it possible to avoid power loss in the transmission areas as well as unreliable complexity of design.

By reducing the number of parts necessitated by design it is possible to reduce the weight of the silage cutting machine.

The contrary movement of the cutting blades of the individual cutting tools as well as the narrower configuration of the cutting tools made possible by this design contribute to the improved cutting power of the silage cutting machine.

Mounting the working cylinders outside of the actual cutting area of the silage cutting machine is advantageous in practical use. It also permits the pressure line to be laid outside of the cutting area.

A complete enclosure of the holding frame including all moving parts except for the cutting edges protruding from the bottom protects against trouble due to clogging.

DETAILED DESCRIPTION OF THE PREFERRED EMBODIMENT

Figure 1:
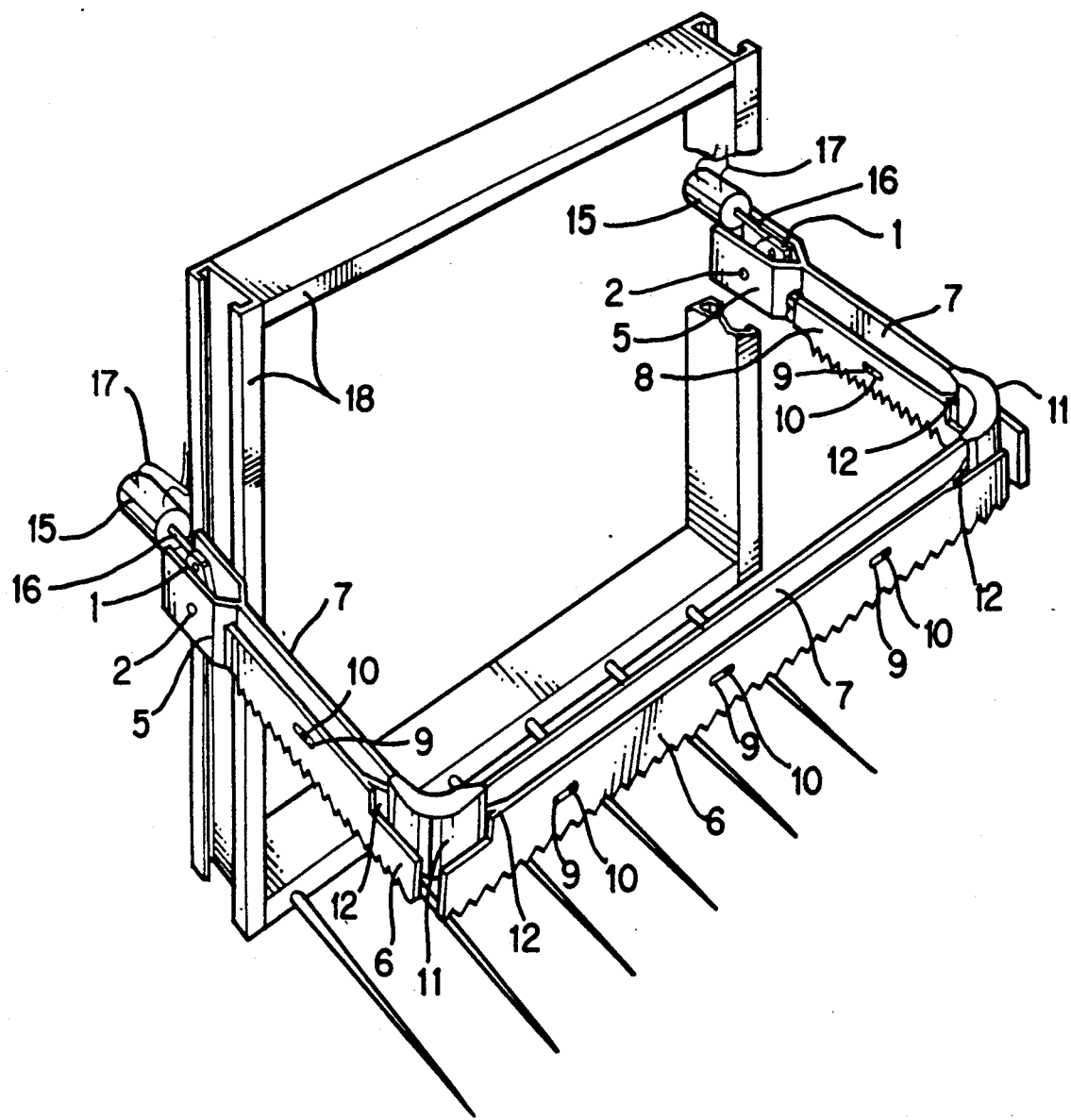
FIG. 1 is a perspective view of the silage cutting machine with U-shaped holding frame

FIG. 1 is a perspective view of a U-shaped holding frame which consists of forked parts 5, which are affixed to the webs 7 of the stationary lateral members and front member of the holding frame. Front cutting blades 6 and rear cutting blades 8 of knife-like configuration are mounted on the webs on pins 10 in slots 9, the cutting blades being drivingly coupled to one another at their end arms 12 through corner couplers 11.

The end of each forked part 5 is connected to a rack 18 and has a driving cylinder 15 fixed thereto. The driving cylinders 15 drive pistons 16 in opposite directions. The pistons cause levers 1 to pivot on pivot pins 2 fixed in the forked parts 5, which sets the cutting blades 6 and 8 in horizontal reciprocating motion. The front blades 6 and the adjacent rear blades 8 are operated in opposite directions.

The pistons 16 of the working cylinders 15 are each coupled by a pivot 3 to the drive levers 1.

Figure 2:
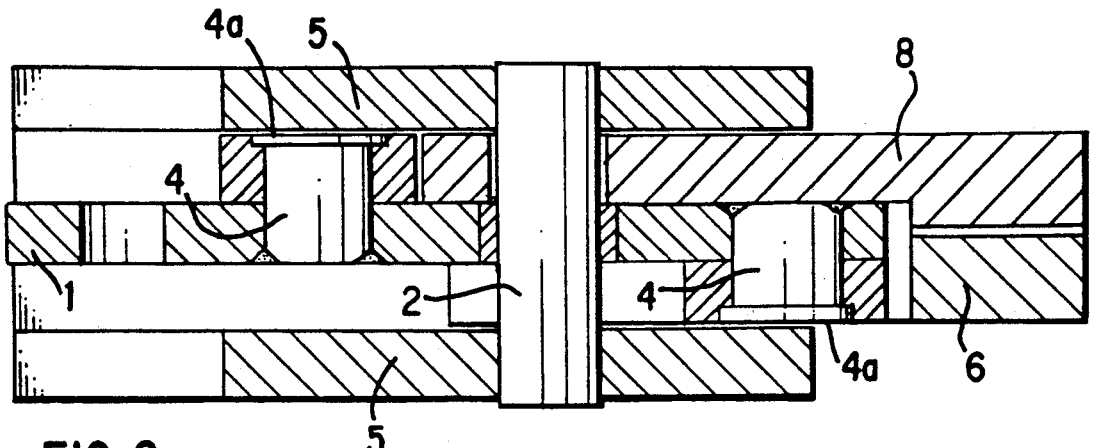
FIG. 2 is a cross section through a drive lever at the pivot pin 2 in FIG. 1

FIG. 2 shows in cross section a drive lever 1 which, in a similar manner in each case, is movable about a pivot 2 fixedly installed in the rack 18 in the forked parts 5 which constitute the connection to the rack. The drive lever 1 is connected by means of a joint 3 to the corresponding drive piston 16 of each working cylinder 15 (FIG. 1). By means of pivot pins 4 welded to the drive lever 1 and placed on studs, the front cutting blades 6 and rear cutting blades 8 of the lateral cutting tools are connected to the drive levers 1.

Figure 3:
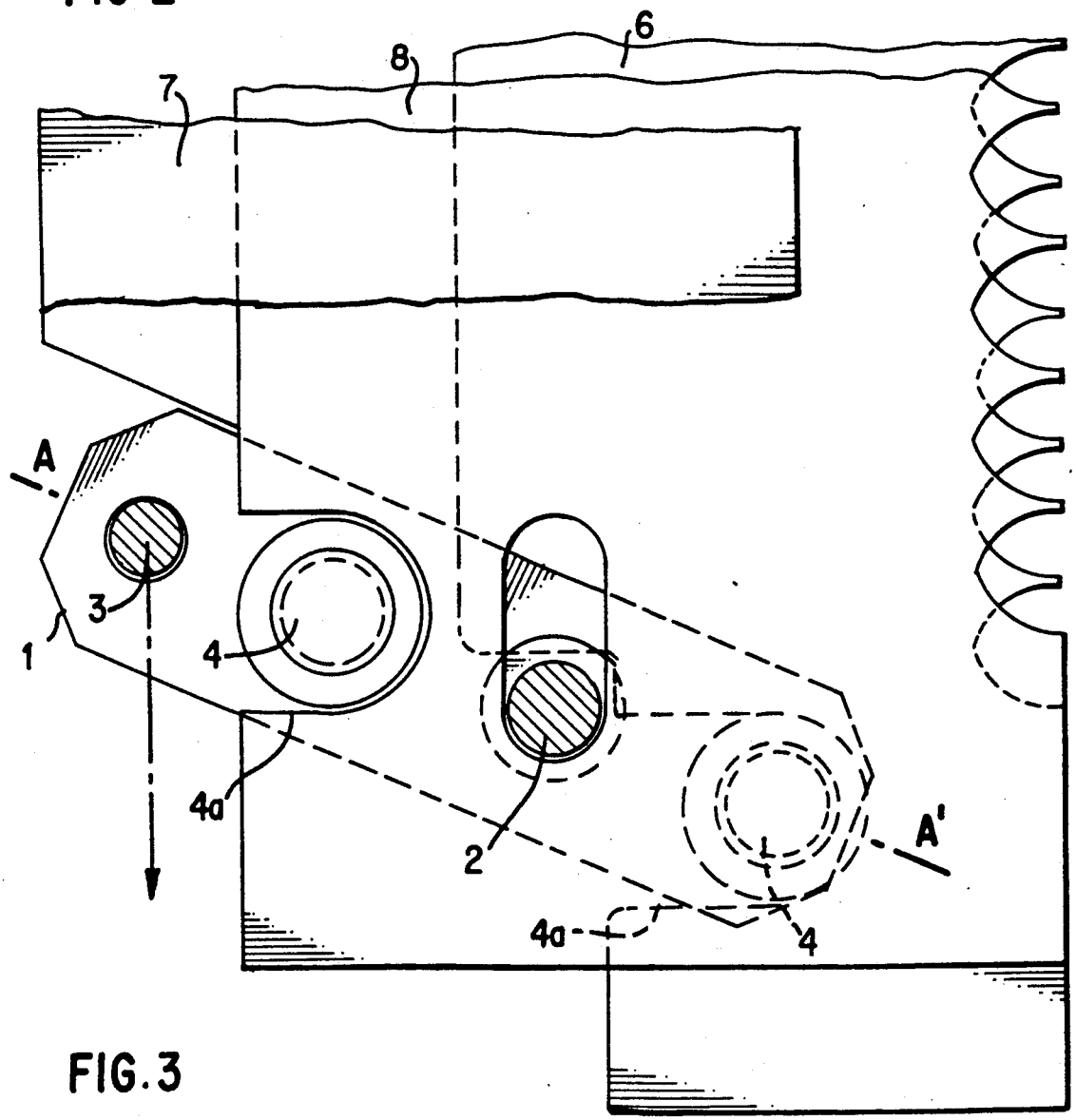
FIG. 3 is a side view of the drive lever represented in cross section in FIG. 2

FIG. 3 represents in a side view the manner of operation of a drive lever 1. The drive lever is movable about a rigid pivot 2. It is connected by a joint 3 to the drive piston of the working cylinder. The front cutting blade 6 and rear cutting blade 8 of the lateral cutting tools are movably joined by the pivot pins 4 which are engaged by their protruding portion with the joint sockets 4a of the cutting blades.

Figure 4:
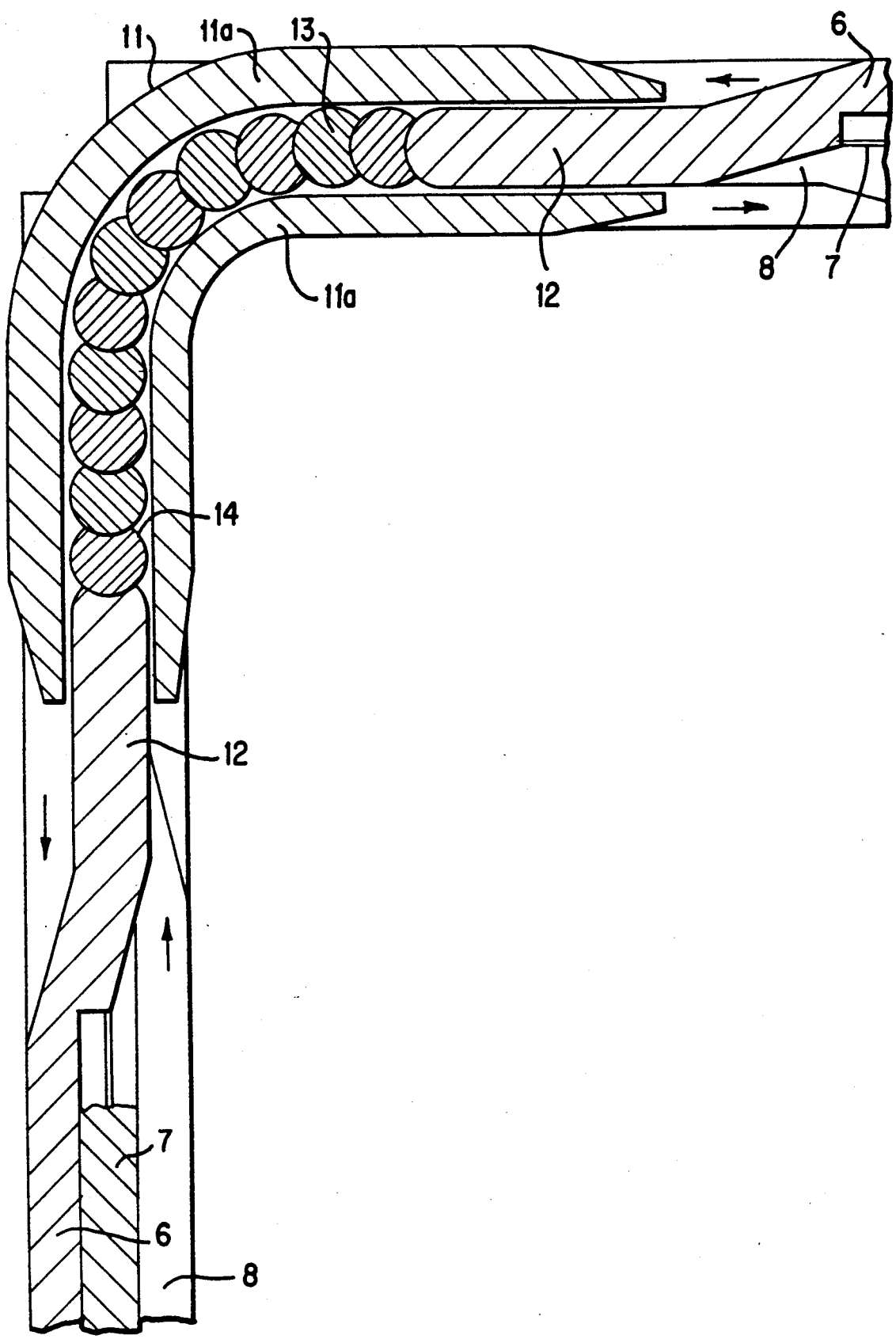
FIG. 4 is a plan section through a corner coupling and the corresponding end arms of a side and front cutting tool

FIG. 4 shows in a plan section the manner of operation of a corner coupling. The cutting blade arms 12 engage in the guide 11a of the corner coupling carried arcuately around the corner and by means of upright metal cylindrical rollers, hollowed arcuately on one side for better engagement with one another, transmit the drive force to one another by means of alternating thrust.

It is apparent that the cutting blades 6 and 8 are bent at their ends toward the center at an angle such that the end arms can lie one over the other in one plane at both levels of the corner coupling.

Figure 5:
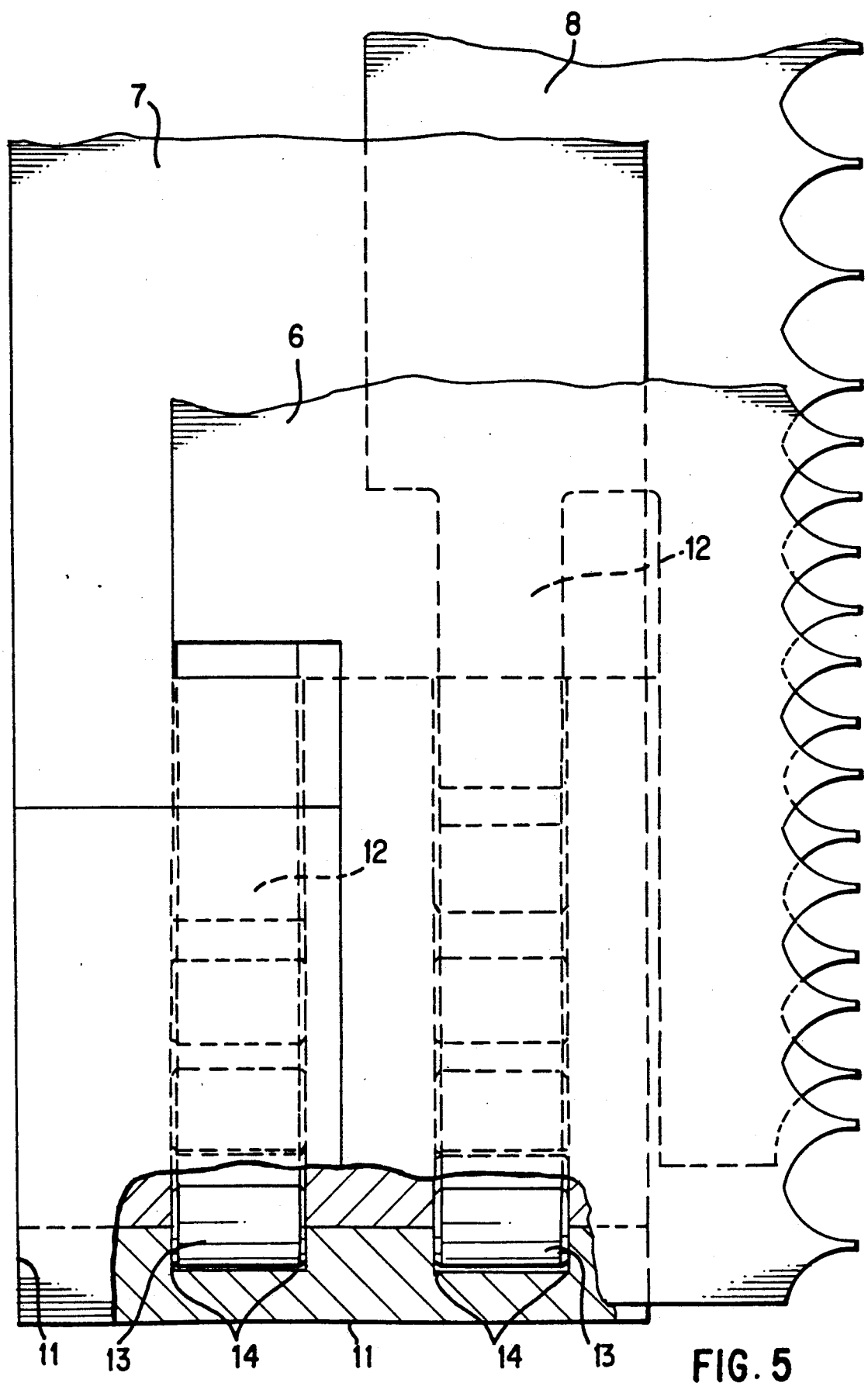
FIG. 5 is a side view of a corner coupling

FIG. 5 shows the manner of operation of the corner coupling 11 in a side view. The end arms 12 of the front cutting blade 6 and rear cutting blade 8 engage in the superimposed guides 11a and carry the driving pressure around the corner through the interengaging metal cylindrical rollers.

Figure 6:
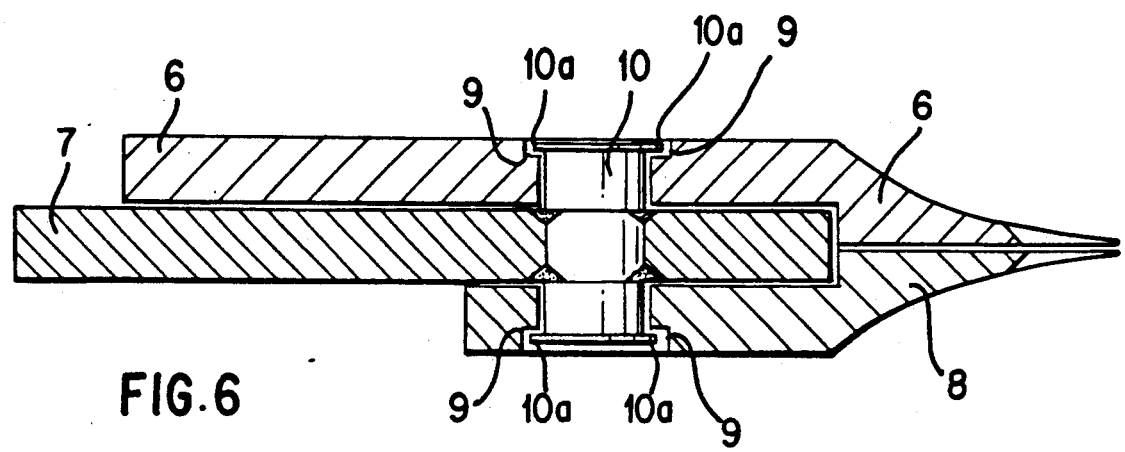
FIG. 6 represents a cutting tool in end section at a guide pin (plane of section A—A of FIG. 7)

FIG. 6 shows in cross section the construction of a cutting tool. In the area of a guide slot 9, the front cutting blade 6 and the rear cutting blade 8 are held parallel to one another by means of a pin 10 welded to the stationary web 7 of the mounting rack. The pin 10 has a protruding head 10a at each end, and engages fittedly the guide slots 9 cut in the cutting blades and thus provide for a precise, flutter-free guidance of the cutting blades.

Figure 7:
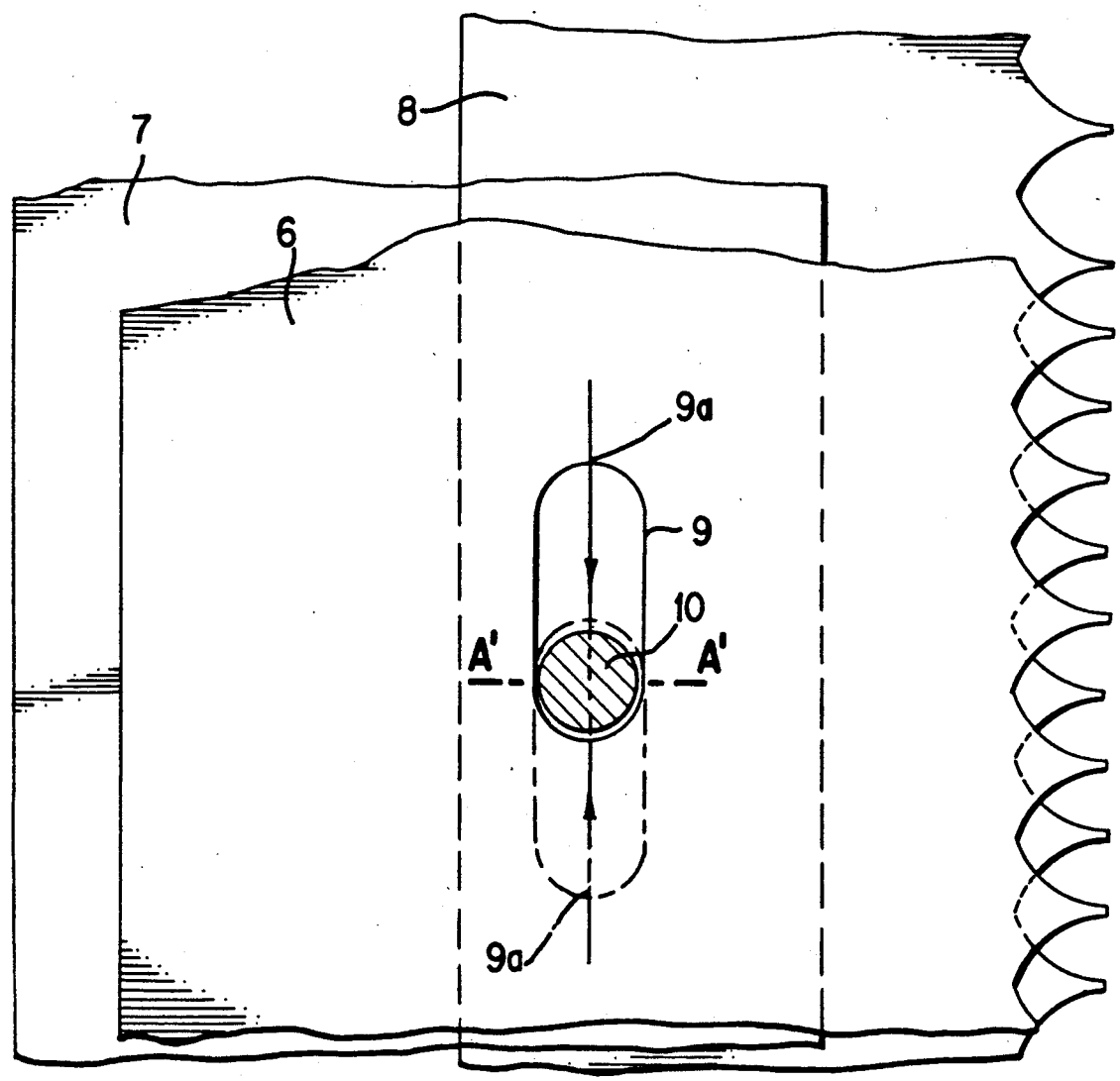
FIG. 7 is a side view of a cutting tool at a guide pin.

FIG. 7 shows a cutting tool in a side view, the front cutting blades 6 parallel to one another and the rear cutting blade 8 being mounted each by means of a pin 10 in a guide slot on the stationary web 7.

The cutting blades can be moved horizontally back and forth on this stationary pin as far as the outer limit 9a of the guide slot.

I claim:

1. Silage cutting machine comprising
   a U-shaped holding frame having a pair of rigid lateral members and a front member extending therebetween, each lateral member having a forked end having a stationary pivot pin therein;
   a pair of corner coupling elements connecting said lateral members to said front member, said coupling elements having compressive force transmitting means therein;
   a pair of cutting blades mounted on each lateral member and on said front member, each pair comprising a front blade slidably mounted on one side of the member to which it is mounted and a rear blade slidably mounted on the other side of the member to which it is mounted, each blade having an end arm received in one of said coupling elements, each front blade transmitting force to another front blade by said force transmitting means, each rear blade transmitting force to another rear blade by said force transmitting means; and
   blade driving means mounted at the forked end of each lateral member, each said blade driving means comprising a drive lever pivoted on a respective said stationary pivot pin, each lever being connected to both the front and rear blades on the lateral member on which said lever is pivoted so that each front blade reciprocates oppositely to the rear blade of the same pair.

2. Silage cutting machine in accordance with claim 1, characterized in that said driving means comprises two working cylinders operating contrariwise and mounted one at each forked end, each working cylinder having a pressure piston which delivers the drive pressure to said drive levers, which levers can pivot on the respective stationary pivot pins.

3. Silage cutting machine in accordance with claim 1, characterized in that said front member and each lateral member has on each side at least one stud, each blade having at least one guide slot therein, said studs engaging in said guide slots to permit slidable movement of said blades relative to said members.

4. Silage cutting machine in accordance with claim 4, characterized in that the studs each have at their end a head protruding beyond the guide slot for the precise lateral guidance of the cutting blades.

5. Silage cutting machine as in claim 1 wherein the corner coupling elements each comprise an arcuate guide housing which guides the force transmitting means between two planes at a right angle to each other transmitting the compressive force through the end arms of the cutting blades on each lateral member to the end arms of the cutting blades on the front member, said end arms of each pair of cutting blades lying one above the other in one of said planes of one of said corner coupling elements.

6. Silage cutting machine in accordance with claim 5, characterized in that the force transmitting means comprises cylindrical rollers standing upright in the guide housing and engaging one another with unilaterally milled arcuate grooves, which transmittingly connect the end arms of the cutting blades on the lateral members to the end arms of the cutting blades on the front member.

7. Silage cutting machine as in claim 1 further comprising a mounting rack, said U-shaped holding frame being attached to said mounting rack and being movable vertically relative thereto.

8. Silage cutting machine as in claim 1 wherein each drive lever has an upper arm with a pivot pin thereon and a lower arm with a pivot pin thereon, each blade on each lateral member being journaled on a respective one of said pivot pins on one of said arms.

9. Silage cutting machine as in claim 1 wherein said end arms of each pair of cutting blades are bent to lie on above another in coplanar relationship.

* * * * *

UNITED STATES PATENT AND TRADEMARK OFFICE
CERTIFICATE OF CORRECTION

PATENT NO. : 5,033,684

DATED : July 23, 1991

INVENTOR(S) : Hans von der Heide

It is certified that error appears in the above-identified patent and that said Letters Patent is hereby corrected as shown below:

Column 1, line 8, "cutting" should be --Cutting--.

Column 6, line 9, "lie on" should be --lie one--.

Signed and Sealed this

Twenty-second Day of June, 1993

Attest:

MICHAEL K. KIRK

Attesting Officer

Acting Commissioner of Patents and Trademarks